(No Model.)

S. W. MARTIN.
CHANGEABLE SPEED GEARING.

No. 293,761. Patented Feb. 19, 1884.

Attest.
Sidney P. Hollingsworth
Harry Shipley

Inventor.
S. W. Martin
By his Attorney
Philip T. Dodge

UNITED STATES PATENT OFFICE.

SAMUEL W. MARTIN, OF SPRINGFIELD, OHIO.

CHANGEABLE-SPEED GEARING.

SPECIFICATION forming part of Letters Patent No. 293,761, dated February 19, 1884.

Application filed December 7, 1883. (No model.)

*To all whom it may concern:*

Be it known that I, SAMUEL W. MARTIN, of Springfield, in the county of Clarke and State of Ohio, have invented certain Improvements in Changeable-Speed Gearing, of which the following is a specification.

The object of my invention is to provide a changeable gearing which shall be noiseless in action and free from the danger of breakage which exists in systems requiring toothed gear to be thrown into and out of action while in motion.

My invention is applicable in all places in which it is required to drive a spindle or its equivalent at different speeds without changing the speed of the prime motor, as in lathes, milling-machines, hoisting-gear, drilling-machines, &c.

The invention consists, essentially, in combining with the spindle and two driving-pulleys arranged to revolve at different speeds around the same an intermediate friction-pulley fixed to turn with the spindle, and arranged to be thrown by a lateral movement directly into engagement with one or the other of the driving-pulleys at will, in the manner hereinafter explained in detail.

Figure 1:
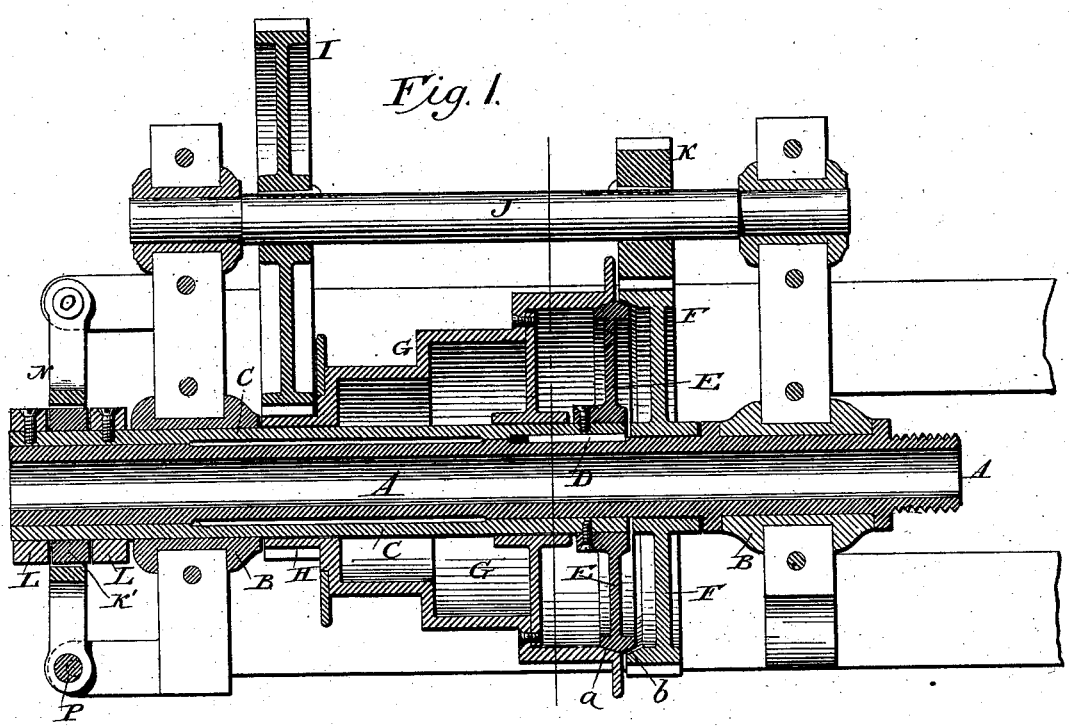
Figure 2:
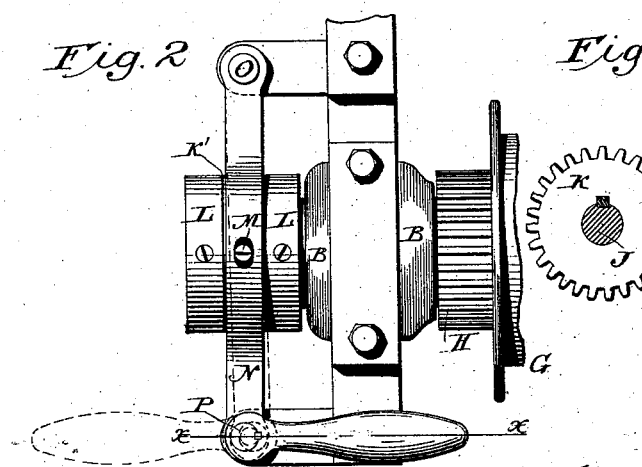
Figure 4:
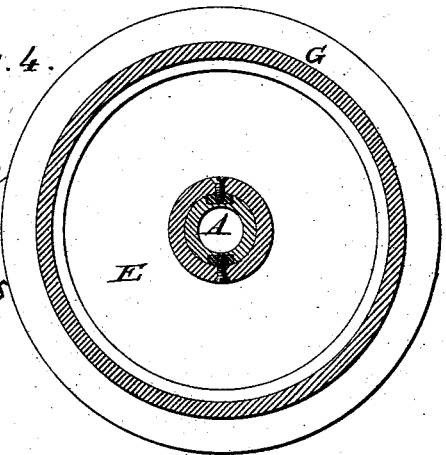
Figure 3:
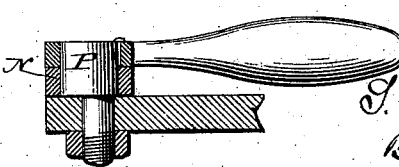

Referring to the accompanying drawings, Figure 1 is a longitudinal central section of my gearing. Fig. 2 is a top plan view of the devices by which the adjustment of the friction-pulley is effected. Fig. 3 is a cross-section on the line *x x*, Fig. 2. Fig. 4 is a cross-section of the spindle with sliding rods therein as substitutes for the external sleeve employed to adjust the friction-pulley.

Referring to the drawings, A represents the usual lathe-spindle, which may be hollow or tubular, as preferred, and which is arranged to revolve at its ends in fixed boxes or bearings B, the construction being such as to prevent end motion of the spindle. Around the spindle there is mounted a tube or sleeve, C, connected thereto by a spline or feather, D, or equivalent means, in such manner that while compelled to rotate the spindle it is free to move lengthwise thereon to a limited extent. On the forward end of this sliding spindle C there is firmly secured a friction-pulley, E, the periphery of which is beveled or coned from the middle downward in opposite directions, as represented at *a* and *b*, Fig. 1. On the lathe-spindle, adjacent to the friction-pulley E, is mounted a loose independently-revolving driving-wheel, F, the periphery of which is provided with spur-teeth, while its overhanging arm is beveled on the inside to encircle and engage with the surface *b* of the driving-pulley E. On the sliding sleeve C there is mounted, so as to revolve loosely, a cone-pulley, G, one end of which is provided with the usual spur-pinion, H, while the opposite end is arranged to encircle one side of the driving-pulley E, and beveled to correspond therewith. The parts are so proportioned and arranged that by moving the spindle C endwise the driving-pulley E may be caused to engage with the cone-pulley or with the wheel F at will, or permitted to stand in an intermediate position free from both.

The small gear H of the cone-pulley engages permanently a large gear-wheel, I, fixed to one end of a counter-shaft, J, the opposite end of which is provided with a small pinion, K, engaging permanently the teeth of the wheel F. This counter-shaft and its wheels are identical with those of ordinary back-gear lathes, with the exception that the shaft may be mounted in fixed bearings, and that its gears remain permanently in engagement. At its outer end the spindle is encircled by a loose ring or collar, K', prevented from moving laterally thereon by means of collars or rings L, secured in place on the spindle. The loose collar K' is provided, as shown in Figs. 2 and 3, with a stud, M, which enters a hole or slot in a horizontal lever, N, one end of which is mounted on a fixed pivot, O, while the opposite end is slotted to receive an eccentric, P, which is pivoted in a fixed support and provided with an operating-handle, as shown. The rotation of this eccentric has the effect of causing the lever and collar to shift the hollow sleeve C in an endwise direction, so as to throw the friction-wheel E into engagement with the cone or the gear F, or to place it in an intermediate position, as the case may be. When the lever is turned in such manner as to throw the spindle to the left, the periphery of the wheel E is caused to engage firmly with the cone-pulley, to which the power for driving the lathe is applied in the ordinary manner. Under the adjustment mentioned the cone-pulley transmits motion through the wheel E to the sleeve C, from which it is in turn transmitted directly to the spindle, which then receives its higher speed. When a decreased speed and increased power are required, the eccentric is turned in the opposite direction, so as to move the sleeve C to the right, the effect of which is to disengage the wheel E from the cone-pulley and cause its engagement with the gear F, under which adjustment the motion will be transmitted from the cone-pulley G, through its pinion H, to the gear I, thence, through the shaft J and smaller pinion K, to the large gear F, which carries with it the friction-wheel E and sleeve C, thereby turning the spindle at its lower speed. When the eccentric stands in its intermediate position, the surface of the wheel E stands midway between the gear F and the end of the cone-pulley, so that the latter is permitted to revolve freely on the spindle, the wheel E, sleeve C, and the spindle remaining at rest.

The essential feature of my invention consists in combining with the driving-gear and the cone-pulley, connected by intermediate gear, a friction-pulley adapted to drive the spindle, and arranged to be engaged with the cone-pulley or the gear F at will.

It will be observed that the sleeve C serves simply as a means of communicating a rotary motion from the gear F to the spindle, and of adjusting the gear lengthwise of the shaft. While it is preferred to retain the sleeve for this purpose, it is obvious that one or more rods seated in longitudinal grooves in the spindle may be substituted therefor, in which case the cone-pulley G will be seated directly upon the spindle. The manner in which these rods will be applied is illustrated in Fig. 4.

The lever and eccentric are found in practice to be the most satisfactory means of effecting the adjustment of the friction-pulley; but it is obvious that any other suitable devices for imparting an end motion to the sleeve and wheel may be employed.

It will be observed that by the employment of the friction-wheel E, having a double conical surface, I am enabled to engage the same with the cone-pulley or with the gear F directly, thus avoiding the expense and complication which would be involved by the use of intermediate parts, and also avoiding the use of wearing-joints or loose pieces. The employment of the cone-pulley is advantageous in that it enables the parts to be started in a noiseless manner and with a gradual movement, thus avoiding the shocks and strains which would otherwise be encountered in practice.

I am aware that in a back-gearing for lathes a cone-pulley and the large gear on the spindle have been connected by means of a toothed clutch, through means of which the spindle could be engaged directly or indirectly with the gear.

Having thus described my invention, what I claim is—

1. The rotary spindle, and the double friction-wheel movable lengthwise thereof, but fixed against rotation thereon, in combination with the driving-gear F, and the cone-pulley and its pinion, both arranged to revolve loosely on the spindle, and the gears connecting the cone-pulley and gear F, substantially as described, whereby the friction-wheel and spindle may be driven directly from the cone-pulley or from the gear F, or permitted to remain at rest.

2. The rotary spindle, the sleeve arranged to rotate therewith and slide thereon, the double conical friction-wheel secured to said sleeve, the gear F, mounted loosely on the spindle and adapted to engage with the friction-wheel, and the cone-pulley mounted loosely on the sleeve and provided with the pinion H, in combination with the differential gear connecting the gear F and pinion H.

3. In combination with the spindle, the sleeve, the friction-pulley, the gear F, the cone-pulley, and the connecting-gear, the collar encircling the spindle, the lever engaging with said collar, and the eccentric to operate the lever.

4. In combination with the spindle, the two toothed wheels arranged to revolve loosely thereon at different speeds, the friction-wheel having tapered surfaces adapted to connect with the two gears alternately, and means, substantially as described, for effecting the lateral movement of the friction-wheel.

5. In combination with the spindle, the loose pulley G and its gear H, the loose gear F, the intermediate connecting-gear, and the friction-pulley connected to the spindle to revolve therewith, and arranged for engagement with the cone-pulley or the driving-gear at will by a lateral movement.

SAMUEL W. MARTIN.

Witnesses:
 GOMER E. HIGHLEY,
 JOS. P. SHARP.